United States Patent
Hertzberg et al.

(10) Patent No.: US 6,390,056 B1
(45) Date of Patent: May 21, 2002

(54) METHOD FOR OPERATING A SPARK IGNITION ENGINE WITH DIRECT FUEL INJECTION

(75) Inventors: Andreas Hertzberg, Stuttgart; Klaus Rössler, Altbach; Guido Vent, Speyer, all of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/659,133

(22) Filed: Sep. 11, 2000

Related U.S. Application Data

(63) Continuation-in-part of application No. PCT/EP99/00794, filed on Feb. 16, 1999.

(51) Int. Cl.$^7$ ............... F02B 17/00; F02B 47/08
(52) U.S. Cl. ............... 123/295; 123/568.14
(58) Field of Search ............... 123/568.14, 90.15, 123/295

(56) References Cited

U.S. PATENT DOCUMENTS

| | | | |
|---|---|---|---|
| 4,700,684 A | * 10/1987 | Pischinger et al. | 123/568 |
| 5,078,107 A | 1/1992 | Morikawa | 123/295 |
| 5,709,190 A | 1/1998 | Suzuki | 123/302 |
| 5,724,927 A | 3/1998 | Suzuki | 123/90.15 |

FOREIGN PATENT DOCUMENTS

| | | |
|---|---|---|
| DE | 39 40 752 | 6/1991 |
| DE | 195 46 453 | 6/1997 |
| EP | 0 661 432 | 7/1995 |
| EP | 0 893 596 | 1/1999 |
| JP | 04183945 | 6/1992 |
| WO | WO97/13063 | 4/1997 |

\* cited by examiner

*Primary Examiner*—Andrew M. Dolinar
*Assistant Examiner*—Johnny H. Hoang
(74) *Attorney, Agent, or Firm*—Klaus J. Bach

(57) ABSTRACT

In a method for operating a spark ignition engine with direct fuel injection, in which the engine is operated either with charge stratification or with a homogeneous charge, the open and/or closed positions of the inlet and exhaust valves are controlled with variable timing depending on the engine operating condition. The timings are determined on the basis of basic timing settings, which are provided in basic timing performance graphs for operation with charge stratification and homogeneous charge operation. The basic timing settings are modified by means of correction values to raise the temperature of the exhaust gas for internal exhaust-gas recirculation and for causing a movement of the charge in the cylinders.

4 Claims, 3 Drawing Sheets

US 6,390,056 B1

METHOD FOR OPERATING A SPARK IGNITION ENGINE WITH DIRECT FUEL INJECTION

This is a continuation-in-part application of International patent application PCT/EP99/00794 filed Feb. 6, 1999 and claiming the priority of German application 198 10 466.9 filed Mar. 11, 1998.

BACKGROUND OF THE INVENTION

The invention relates to a method of operating a spark ignition engine with direct fuel injection in which the engine is operated selectively with charge stratification or with a homogeneous charge.

During operation with charge stratification, referred to as stratified-charge operation, the fuel is injected during the compression stroke, preferably with a significant excess of air, in such a way that the fuel is in the combustion chamber in stratified form whereby the fuel/air mixture is reliably ignited despite the excess of air. Operation with charge stratification allows lower fuel consumption in comparison with conventional external mixture formation, mainly because the charge change, pumping and wall-heat losses are lower. However, stratified-charge operation is restricted to the part-load engine operating range, whereas, at a higher engine loads, the direct-injection spark ignition engine is operated homogeneously, i.e. the combustion chamber is supplied with the fuel in a homogeneously distributed manner, the fuel injection taking place during the intake stroke with a stoichiometric fuel/air ratio.

DE-A1 39 40 752 discloses a method for operating a spark ignition engine without a throttle valve, in which the opening times of the inlet valves, via which a fuel/air mixture prepared in the intake pipe is introduced into the respective combustion chamber, and the fuel quantities are set in a variable manner as a function of the engine speed and the position of the accelerator pedal. This is intended to ensure that the masses of air and fuel are always optimally matched to one another under all driving conditions, even in the case of sudden changes in the position of the accelerator pedal. In this way, a high level of refinement without misfiring is obtained while low fuel consumption and pollutant emissions are generated. When required, this variable control of the inlet-valve opening times is also used to achieve internal exhaust-gas recirculation by controlling the respective inlet valve in such a way that it is opened while the associated cylinder piston is still expelling exhaust gas from the respective combustion chamber. Provisions can also be made to provide two inlet ducts for each combustion chamber, namely a swirl duct and a filling duct, each of which has its own controllable inlet valve. The air entering via the swirl duct is subject to a high degree of swirl, leading to good mixture preparation, while the air flowing through the filling duct enters the combustion chamber with as little resistance as possible and hence a low degree of swirl. In the lower load range, the filing-duct inlet valves are then held continuously closed. In a higher load range, the maximum possible quantity of air is made to enter the cylinder via the swirl-duct inlet valves. Depending on the air-quantity requirements, individual cylinders may remain completely switched off, or the remaining air mass is drawn in via the filling-duct inlet valves.

German Patent Application 197 12 356.2 disclose a method for reducing noxious exhaust emissions from a direct-injection spark ignition engine operated on a lean fuel/air mixture, in which there is alternation between stratified-charge operation ad homogeneous charge operation for the purpose of regenerating an $NO_x$ adsorber-type catalytic converter. In the part-load range, the engine is normally operated with a lean mixture in stratified-charge mode. As soon as regeneration of the adsorber-type catalytic converter is necessary, during which process the nitrogen oxides adsorbed by the converter are released and reduced, a switch is made to homogeneous charge engine operation such that, in a first step, the air quantity in the combustion chamber is reduced by means of changes in timing of the valve or by means of throttling devices in an associated intake duct. In a second step, a transition is made from stratified-charge operation to homogeneous charge operation with a rich fuel/air mixture. The air quantity can be reduced, in particular, by delayed closure of the inlet valves after bottom dead center or by their early closure after the top dead center of the combustion-chamber piston.

It is the object of the invention to provide an optimized method for operating a direct-injection spark ignition engine.

SUMMARY OF THE INVENTION

In a method for operating a spark ignition engine with direct fuel injection, in which the engine is operated either with charge stratification or with a homogeneous charge, the open and/or closed positions of the inlet and exhaust valves are controlled with variable timing depending on the engine operating condition. The timings are determined on the basis of basic timing settings, which are provided in basic timing performance graphs for operation with charge stratification and for homogeneous charge operation. The basic timing settings are modified by means of correction values to raise the temperature of the exhaust gas for internal exhaust-gas recirculation and for initiating a movement of the charge in the cylinders.

This method involves variable valve timing, during which the inlet and exhaust valves are moved in a controllable manner to their open and closed positions depending on engine operating conditions. In this method, the determination of the valve timings is based on basic timings, which are provided in a controllable manner by respective basic timing performance graphs for operation with charge stratification, on one hand, and for homogeneous operation, on the other hand. By means of this variable valve timing, the engine can be operated either with charge stratification or with a homogeneous charge. In addition, the basic timing values specified by these two performance graphs can be modified by means of timing correction values in order to provide for an increase in the temperature of the exhaust gas or to provide for internal exhaust-gas recirculation and/or a movement of the charge as part of the variable valve timing. Increasing the temperature of the exhaust gas is appropriate particularly where there is a downstream catalytic converter since those generally have a satisfactory conversion performance only at a certain elevated temperature level of the exhaust gas, as is the case, for example, with $NO_x$ adsorber-type catalytic converters. Special measure of raising the temperature of the exhaust gas, may be provided, whereby the exhaust-gas temperature range can be adjusted to be favorable for the catalytic converter to prevent its temperature from falling too low during low engine load and stratified-charge operation.

Two particularly advantageous measures for raising the temperature of the exhaust gas by an appropriate selection of timing corrections are provided.

This makes it possible to raise the temperature of the exhaust gas by reducing the air quantity without significant throttling losses and without a significant rise in fuel consumption.

Internal exhaust-gas recirculation is made possible by early opening of the inlet valves while the respective operating cycle is still in the exhaust-gas expulsion phase.

If the spark ignition engine has at least two inlet valves for any particular combustion chamber a movement of the charge by appropriate differences in the control of the two inlet valves can be initiated.

Advantageous embodiments of the invention will be illustrated below on the basis of the drawings:

DESCRIPTION OF PREFERRED EMBODIMENTS

Figure 1:
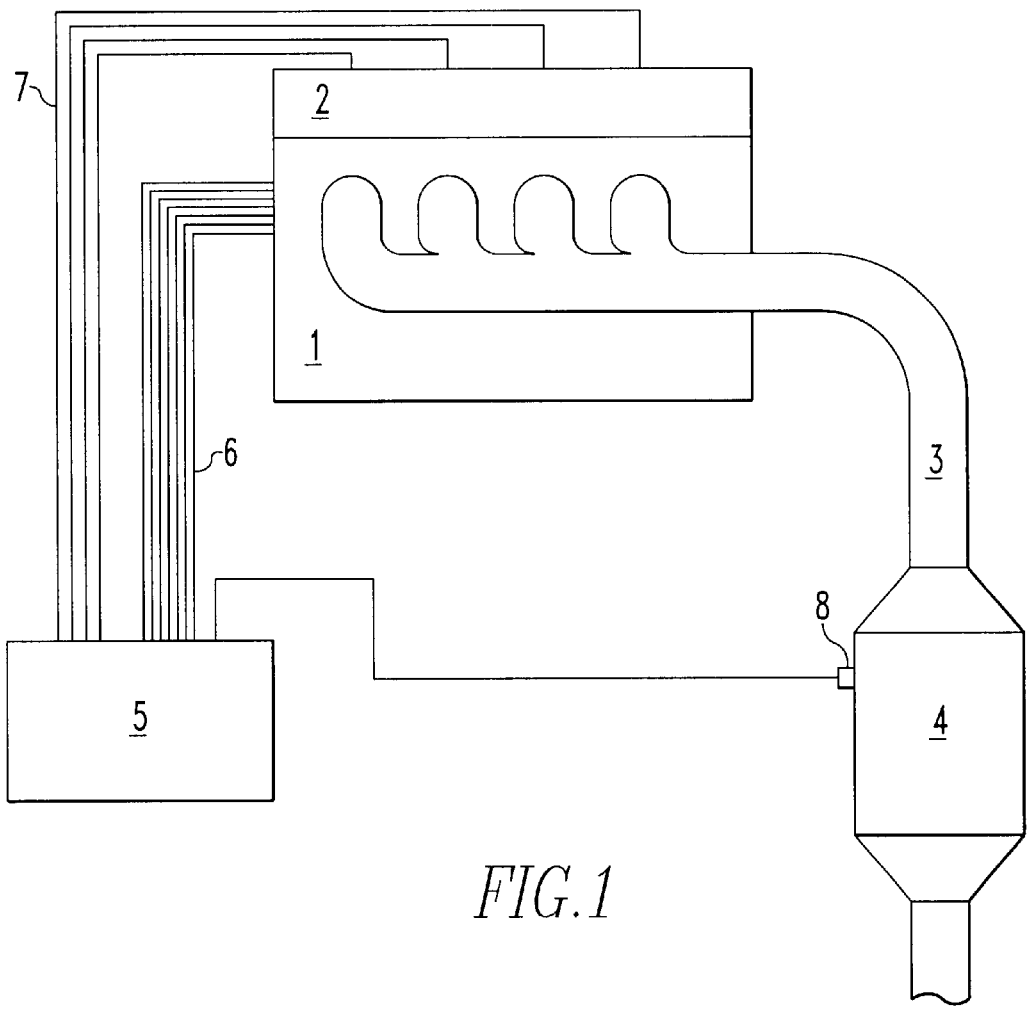
FIG. 1 is a schematic representation of a spark ignition engine with direct fuel injection, variable valve timing and an $NO_x$ adsorber-type catalytic converter.

FIG. 1 is a schematic block diagram of a spark ignition engine of the type particularly suitable for a motor vehicle. The spark ignition engine shown comprises an actual engine block 1, a valve drive arrangement 2 with variable inlet and exhaust valves for the respective engine cylinders, an exhaust line 3, which leads off the engine block 1 and contains an $NO_x$ adsorber-type catalytic converter 4, and an engine control unit 5 for controlling the various engine functions. For this purpose, a first wiring harness 6 leads from the engine control unit 5 to the engine block 1, and a second wiring harness 7 extends between the engine control unit 5 and the valve gear arrangement 2 for the variable control of the inlet and exhaust valves. The catalytic converter 4 is provided with a temperature sensor 8 having an electrical connection via which the engine control unit 5 detects the temperature of the exhaust gas in the catalytic converter.

Figure 2:
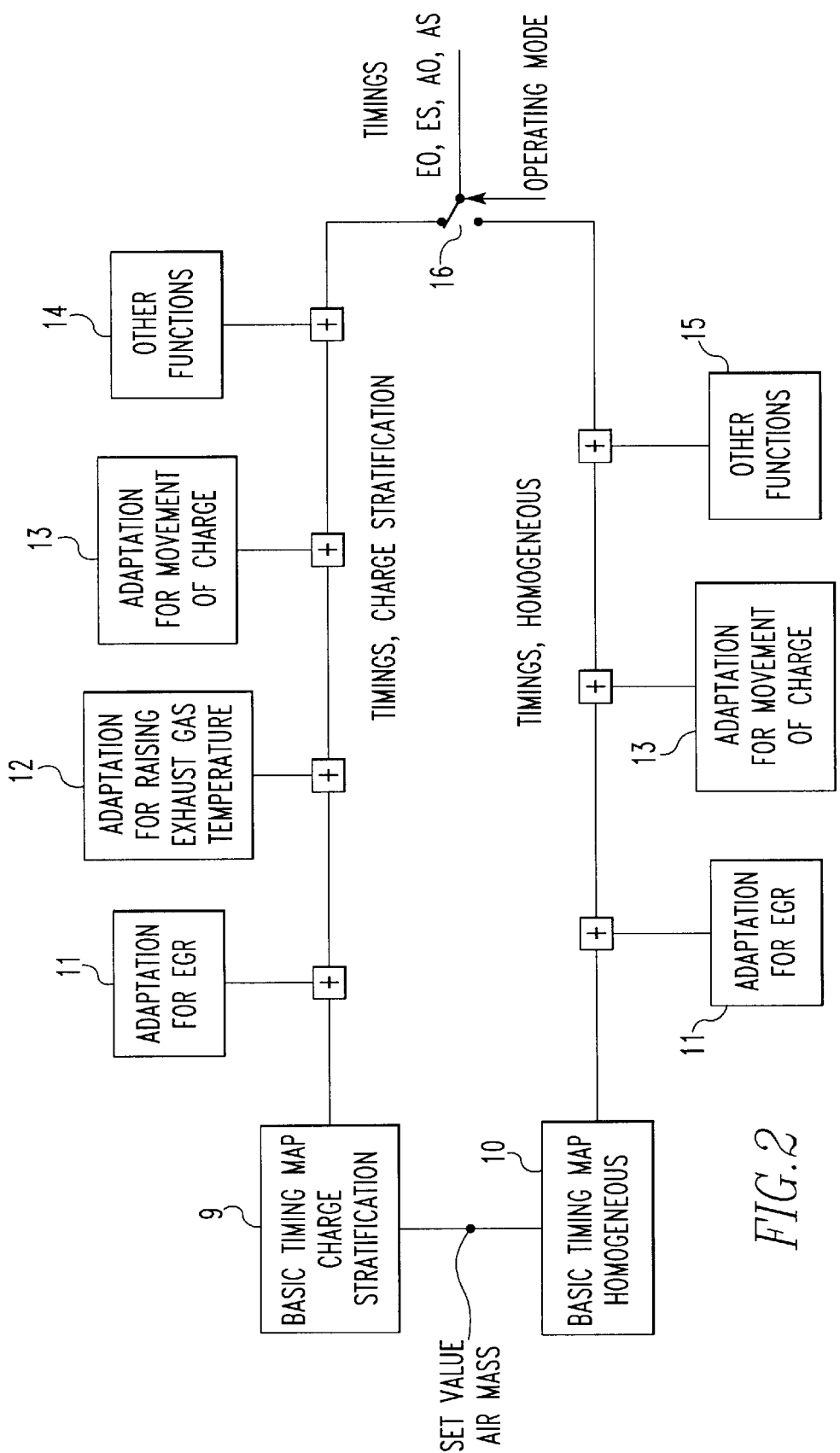
FIG. 2 shows a schematic flow diagram for the determination of the variable valve timings which is carried out by an engine control unit in FIG. 1.

In the engine control unit 5, the values for the timings of the various inlet and exhaust valves of the valve drive 2 are determined as a function of the respective instantaneous engine operating condition and the desired engine functionality in accordance with the block diagram illustrated in FIG. 2. For this purpose, a first basic timing performance graph 9 for engine operation with a stratified charge and a second basic timing performance graph 10 for homogeneous engine operation are stored in the engine control unit 5. Basic timing settings for the respective engine operating mode are determined from the corresponding basic timing performance graph 9, 10 as a function of the set air-mass value, depending on whether the engine is to be operated in stratified-charge mode or in homogeneous charge mode at any particular instant. These basic timing settings are modified in accordance with the engine operating mode and desired engine functionality by added correction timing values in order to obtain the timing values desired for the instantaneous situation in terms of injection-valve opening times (EÖ), injection-valve closing times (ES), exhaust-valve opening times (AÖ) and exhaust-valve closing times (AS).

As can be seen from FIG. 2, particular timing corrections provided for the stratified-charge mode are a timing correction value 11 for initiating internal exhaust-gas recirculation, a timing correction value 12 for raising the temperature of the exhaust gas and a timing correction value 13 for initiating movement of the charge. In the homogeneous charge mode, the timing correction value 11 for initiating internal exhaust-gas recirculation and the timing correction value for initiating a movement of the charge 13 are provided. Further timing correction values 14, 15 can additionally be provided both in a stratified-charge mode and in a homogeneous charge mode, depending on the application. Depending on the desired operating situation, one or more or none of the timing correction values are combined with, e.g. added to, the basic timing values determined from the respective performance graph 9, 10 to obtain the appropriate valve-timing settings (EÖ, ES, AÖ, AS). The engine control unit 5 then controls the various inlet and exhaust valves of the valve drive 2 by means of the valve-timing settings (EÖ, ES, AÖ, AS), switching between determination of timing values for the stratified-charge mode and those for the homogeneous charge mode depending on the desired operating mode, as indicated by a switching function 16 in FIG. 5. Various operating variants that can be achieved with the spark ignition engine shown in FIGS. 1 and 2 will be explained in greater detail below.

If the spark ignition engine has a plurality of inlet valves for any particular combustion chamber, it is possible to achieve a movement of the charge over the entire engine operating range by means of variable valve timing. Intensive and specifically matched movement of the charge is expedient and indeed frequently necessary particularly for the stratified-charge combustion concept. Variable valve timing makes it possible to provide for a movement of the charge, i.e. to provide swirl in the air stream admitted to the combustion chamber. This is achieved by providing different timing values for the two or more inlet valves of the respective combustion chamber by the use of the corresponding timing correction values 13, resulting in a swirling motion of the entire air stream in the combustion chamber. In this way the movement of the charge can be controlled over the entire operating range of the engine, thereby making it possible to stabilize the combustion process and, if required, to extend the performance graph range for the stratified-charge mode.

Providing for the variable movement of the charge by means of variable valve timing is also advantageous during homogeneous charge engine operation since, at least in parts of the performance graph, combustion can be accelerated by appropriate movement of the charge, leading to a thermodynamically more favorable conversion. Moreover, appropriate movement of the charge can be used to shift the operating limit for homogeneous lean-mixture operation towards higher excess of air. This makes it possible to reduce fuel consumption and emissions of untreated nitrogen oxides compared with stoichiometric operation. Homogeneous charge, lean-mixture operation can be an alternative operating mode to stratified-charge operation in certain areas of the performance graph at very low engine loads, in order to achieve a higher temperature of the exhaust gas while nevertheless achieving relatively good fuel economy or at relatively high engine speeds and engine loads.

Another operating option that can be implemented by means of variable valve timing is internal exhaust-gas recirculation. In the case of spark ignition engines with direct fuel injection, exhaust-gas recirculation is an advantageous measure for the purpose of minimizing emissions of untreated nitrogen oxides. Compared with external exhaust-gas recirculation, internal exhaust-gas recirculation has the advantage that no throttling, for example by means of a throttle valve, is required, thereby avoiding increased pumping work and the associated increase in fuel consumption. Internal exhaust-gas recirculation is achieved by appropriate selection of the timing values for the inlet and exhaust valves, in particular by opening the inlet valves while the engine is still in its exhaust expulsion phase, during which the exhaust gas is expelled from the combustion chamber by the piston. At an engine speed of 3000 rpm and a mean effective pressure of 3 bar, the following timing values are suitable for obtaining a residual exhaust gas component of about 20%, for example. The selected opening time value for the exhaust valves is between 80° of crank angle and 40° of crank angle before bottom dead center (BDC), while the closing time for the exhaust valves is between 0° of crank angle and 150° of crank angle after top dead center (TDC). The opening time for the inlet valves is within a range of between −20° of crank angle after TDC and 130° of crank angle after TDC, and the closing time for the inlet valves is between 10° of crank angle after BDC and 50° of crank angle after BDC. The desired timing values are obtained from the performance graph-based basic timing settings by using the relevant correction timing value 11.

As a further operating option, spark ignition-engine load control by means of variable valve timing as considered here makes it possible to raise the temperature of the exhaust gas in a low engine-load range, in particular at minimum engine load. In this load range, the direct fuel-injection spark ignition engine is generally operated in stratified-charge mode with a very large excess of air, resulting in exhaust-gas temperatures which are about 200° C. to 300° C. lower than in stoichiometric operation. As a result, the temperature of the exhaust gas at idle can fall to below 150° C., for example. This often undesirable. For effective exhaust-gas treatment by means of a corresponding catalytic converter, for example, the temperature range in which the catalytic converter actively performs conversion must be maintained. Current $NO_x$ adsorber-type catalytic converters only have a satisfactory conversion performance at exhaust-gas temperatures of at least 200° C. With conventional load control, the temperature of the exhaust gas can be raised by throttling using a throttle valve. But this increase the piston pumping work and wall heat losses and hence fuel consumption because of a reduction of the excess of air. By means of the variable valve timing under consideration, the desired reduction in the delivery rate for the air quantity can be achieved without significant throttling losses by closing the inlet valves relatively early, i.e. earlier than in the relatively high engine-load range. This makes it possible to raise the temperature of the exhaust gas without simultaneously increasing fuel consumption. The timing values required herefor are determined on the basis of the basic timing values using the associated timing correction values 12 provided only for the stratified-charge mode. At an engine speed of 2000 rpm and a mean effective pressure of 2 bar, the following inlet-valve timing values are suitable for the purpose of raising the temperature of the exhaust gas. An inlet-valve opening time between 20° of crank angle of 60° of crank angle before TDC, early closure of the inlet valves between 10° of crank angle and 50° of crank angle after BDC leads to an exhaust-gas temperature in the order of 200° C. Even earlier closure of the inlet valves between 10° of crank angle and 50° of crank angle before BDC can lead to an exhaust-gas temperature in the order of about 250° C.

As an alternative to this early closure of the inlet valves during each operating cycle, re-induction of the oxygen-containing exhaust gas for the next operating cycle can be achieved if the inlet valves remain closed for one or more cycles. It is thereby likewise possible to achieve a significant increase in the temperature of the exhaust gas.

Variable valve timing is also used when switching between unthrottled operation with a stratified charge and a loan fuel/air mixture and homogeneous charge operation with a rich or stoichiometric fuel/air mixture.

Figure 3:
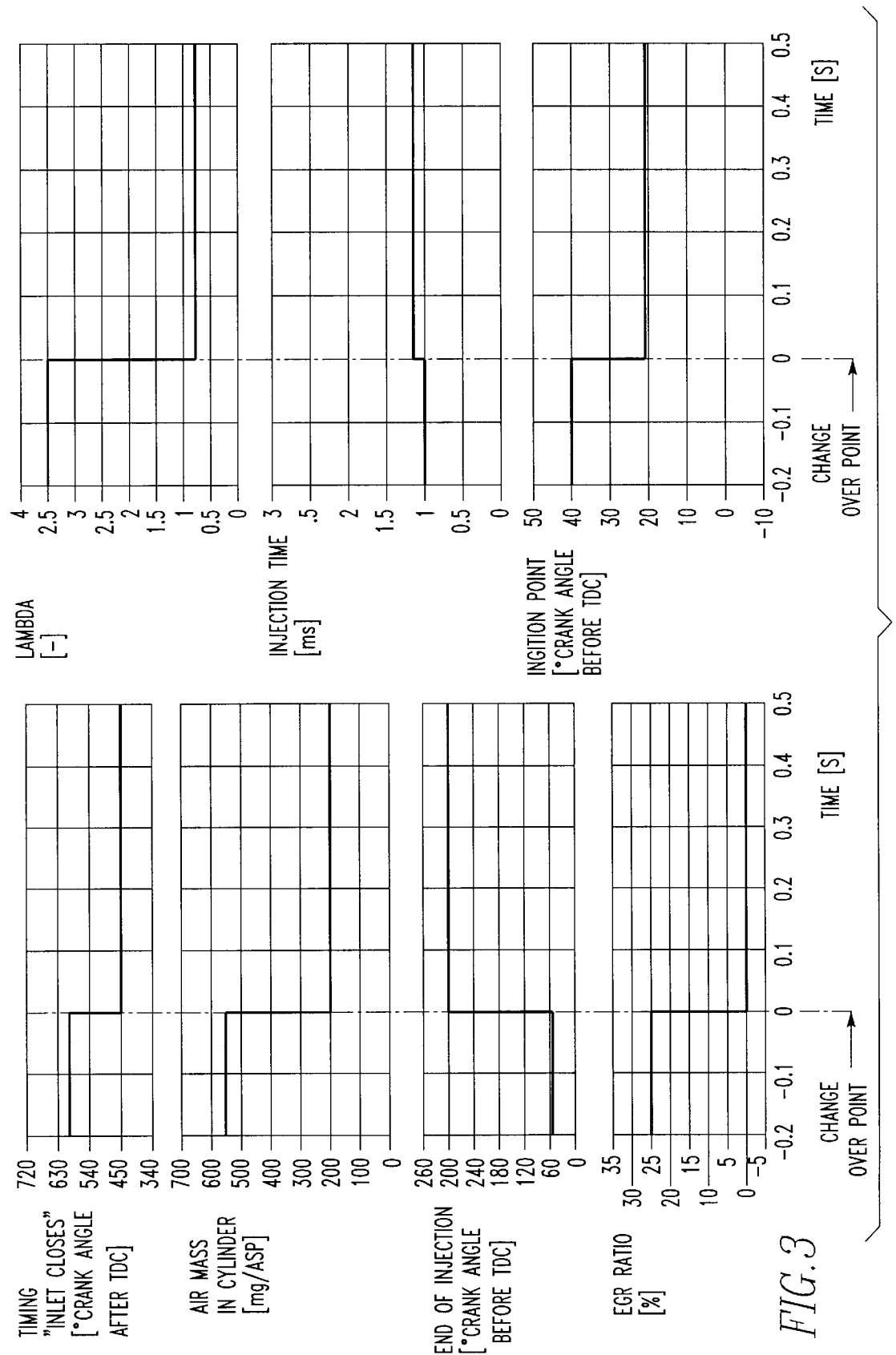
FIG. 3 shows timing diagrams of various engine-specific variables to illustrate a change in operating mode from stratified-charge operation to homogeneous charge operation for a spark ignition engine, using the variable valve timing.

Switching between operating modes in this way is necessary when making a transition from a relatively low engine-load range to a higher engine-load range and vice versa. Such switching between operating modes is furthermore employed when using a $NO_x$ adsorption-type catalytic converter to change between the adsorption mode and the desorption mode of the converter. When the catalytic converter is saturated with the nitrogen oxides it has adsorbed, it is switched from an adsorption mode to a desorption mode, in which the adsorbed nitrogen oxides are desorbed and reduced, thus regenerating the catalytic converter. To effect this regeneration, as sudden a change as possible from the lean-mixture mixture operation with a stratified charge to a rich-mixture operation with values of the air/fuel ratio lambda of less than one is required. With the change in operating modes, the set values for cylinder filling, the injection time, the exhaust-gas recirculation rate and the air/fuel ratio are changed. FIG. 3 illustrates a change in the operating mode involving the use of variable valve timing. It shows time-synchronous diagrams of the variation with time in the engine-specific variables which are characteristic of the change in operating modes from stratified-charge operation to homogeneous charge operation.

In the case of a change in operating modes with conventional throttle-valve control, the reduction in the cylinder filling rate after the closure of the throttle valve takes place relatively slowly over many operating cycles because of the dynamics of the intake pipe. To obtain the desired lambda characteristic with a constant engine torque, transfer functions for the injection time and the ignition point are required. If, in addition, external exhaust-gas recirculation is provided, the exhaust-gas recirculation rates achieved are dependent on the intake-pipe pressure.

In contrast to this, FIG. 3 shows that a comparatively abrupt change in operating mode from stratified-charge mode to a homogeneous charge mode is achieved from one operating cycle to the next by using variable valve timing. Here, the vertical line marks the time at which the inlet valves are closed, see topmost diagram on the left. As a result, the air mass in the combustion chamber falls immediately, without a delay, to the desired value from one operating cycle to the next, see the second diagram from the top on the left. Also coinciding with the closure of the inlet valves are the changes in the termination of the injection, the lambda value, the injection time and the ignition point, see second diagram from the bottom on the left and the diagrams on the right. Variable valve timing of the inlet and exhaust valves can moreover be used to abruptly change the recirculation rate from one operating cycle to the next in the case of internal exhaust-gas recirculation. Thus, the diagram at the bottom on the left illustrates the drop in the exhaust-gas recirculation rate from 25% to 0% when the change from stratified-charge mode to homogeneous charge mode occurs. Internal exhaust-gas recirculation can thus be integrated into the change in operating modes without any problems.

The above description of an advantageous exemplary embodiment shows that, with the variable timing of the inlet and exhaust valves employed here, it is possible to achieve functionally optimal operation of a spark ignition engine with direct fuel injection, allowing very refined operation particularly when used in motor vehicles. In addition to the functions mentioned, the method under consideration also makes it possible to raise the maximum mean pressure in a manner known per se by combining direct fuel injection and variable valve timing. It is made possible in this way to achieve an improvement in volumetric efficiency in comparison with conventional intake-pipe fuel injection by adapting the value timings to the engine speed at full load.

What is claimed is:

1. A method for operating a spark ignition engine with direct fuel injection and with controllable intake and exhaust valves, wherein the engine is operated selectively either with charge stratification or with a homogeneous charge, said method comprising the steps of: controlling the open and closed positions of the inlet and exhaust valves with timings which are varied as a function of the engine operating condition, the timings being determined on the basis of basic timing settings which are specified in a controllable manner by respective basic timing performance graphs for operation with charge stratification, on the one hand, and homogeneous charge operation, on the other hand, said basic timing settings being modified by means of correction values to selectively raise the temperature of the exhaust gas, to initiate internal exhaust gas recirculation and to produce a movement of the charge within the engine cylinders.

2. A method according to claim 1, wherein, for a low engine load range, in which the engine is operated with charge stratification, timing correction values for raising the temperature of the exhaust gas are provided in such a way that the respective inlet valve closing is advanced with respect to a higher load range or is held closed over one or more operating cycles.

3. A method according to claim 1, wherein timing corrections for achieving internal exhaust gas recirculation are provided whereby the respective inlet valves are opened while the respective cylinders are still in the exhaust gas expulsion phase.

4. A method according to claim 1 for operating a spark ignition engine with at least two inlet valves for any particular combustion chamber, wherein timing correction for producing a movement of the charge are provided in such a way that, at least under certain engine operating conditions, said at least two inlet valves are opened and closed at different times for the purpose of producing a movement of the charge in the respective combustion chamber in a certain way.

* * * * *